March 28, 1933.   C. A. NEVINS   1,903,191

PISTON AND WRIST PIN CONSTRUCTION

Filed July 17, 1931

Inventor
CHARLES A. NEVINS
By his Attorney
Edmund C. Borden

Patented Mar. 28, 1933

1,903,191

UNITED STATES PATENT OFFICE

CHARLES A. NEVINS, OF NEW YORK, N. Y., ASSIGNOR TO DOHERTY RESEARCH COMPANY, OF NEW YORK, N. Y., A CORPORATION OF DELAWARE

PISTON AND WRIST PIN CONSTRUCTION

Application filed July 17, 1931. Serial No. 551,345.

This invention relates to improvements in piston and wrist-pin construction, and more particularly to wrist pins for pistons of small diameter used in high pressure, high speed automotive engines.

It is the principal object of this invention to provide a wrist pin of relatively light weight having a large bearing surface which evenly distributes the forces acting on the fact of the piston to the connecting rod during the operation of the engine.

To this end it is a feature of this invention to provide a wrist pin formed of a hollow tubular body expanded centrally to provide an enlarged bearing portion for attachment to the connecting rod, thereby providing a wrist pin which is both light in weight and affords a bearing surface of large area.

It is a further object of this invention to provide a simple means of fastening a wrist pin within a piston in a manner which will be readily accessible and which will avoid the necessity for lateral openings in the skirt of the piston.

To attain this object, it is a feature of this invention to provide a construction in which the wrist pin, after having been positioned in the eye of the connecting rod, may be inserted in the piston and clamped against an internal shoulder thereof by fastening means located adjacent the lower open end of the piston.

These and other objects and features of the present invention will be apparent to those skilled in the art from the following detailed description of the preferred embodiment of the invention taken in conjunction with the accompanying drawing, in which.

Figure 1:
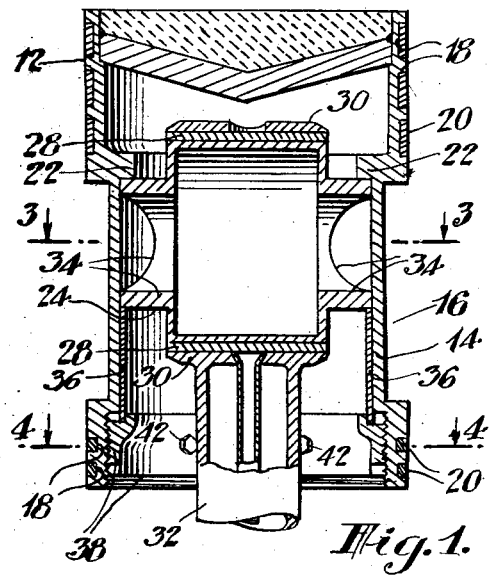
Fig. 1 shows a longitudinal section through a piston and wrist pin assembly in accordance with the present invention.
Figure 2:
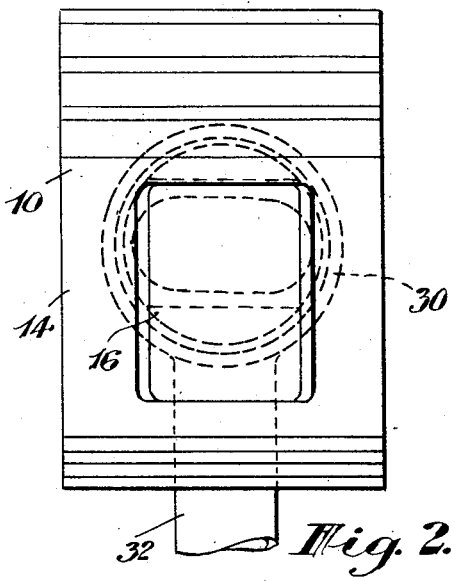
Fig. 2 shows the piston in side elevation.
Figure 3:
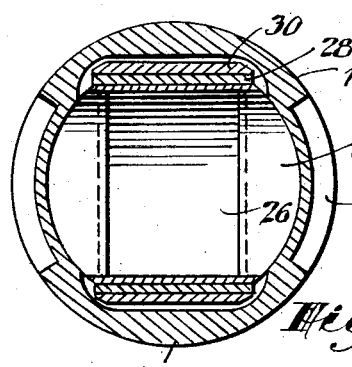
Fig. 3 shows a cross-sectional view looking down on line 3—3 of Fig. 1.
Figure 6:
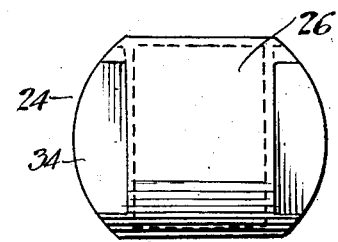
Fig. 6 is a top plan view of the wrist pin showing the contour of the end portions of the same.
Figures 5, 7:
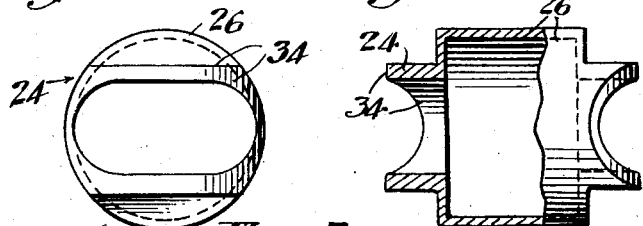
Fig. 5 shows partly in section, and partly in side elevation, a wrist pin constructed in accordance with this invention.
Fig. 7 is an end view of the wrist pin shown in Figs. 5 and 6.
Figure 4:
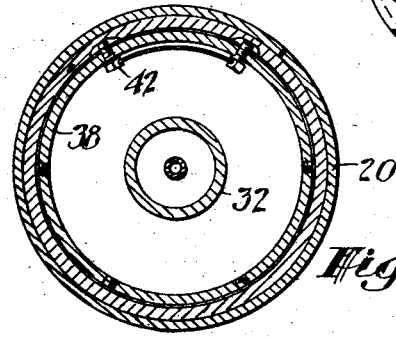
Fig. 4 shows a cross-sectional view looking down on line 4—4 of Fig. 1.

Referring to the drawing, piston 10 as illustrated is of a type suitable for use in internal combustion engines having its upper end closed by a head 12 which is directly subjected to the forces generated by the combustion of gases in the engine cylinder. The body of the piston is formed by a hollow cylinder 14 which is open at its lower end. The external wall of the cylinder 14 is recessed as indicated at 16, thereby making the piston especially adapted for use in engines having piston controlled ports instead of valves. The cylinder 14 is circumferentially grooved at the upper and lower ends thereof as shown at 18 for the insertion of piston rings 20.

Within the upper end of the hollow cylinder 14 is a circumferential shoulder 22 facing the open end of the piston and providing seats for the ends of a hollow wrist pin 24.

The wrist pin 24 is formed of a hollow tubular body having an enlarged cylindrical or drum-shaped central portion 26 upon which rests a bearing or bushing 28. An eye 30 of a connecting rod 32 is fitted on wrist pin 24 with sufficient clearance to allow for oscillation of the rod relative to the pin during operation before it is finally assembled with the piston. Projecting at right angles from each side of the drum-shaped portion 26, and parallel to its axis are rectangular shaped portions 34, the end surfaces of which conform to the inner surface of the piston 10. These portions act as lugs to conveniently locate the wrist pin against the shoulder 22 and are made in such proportions as to carry the load or force exerted on the piston head by the pressure of gases in the cylinder.

The wrist pin 24 is held in a rigid position, due allowance being made for expansion and contraction of the piston by a cylindrical collar forming a spacer ring 36 bearing against the bottom of the rectangular portion 34 and clamping the same against the shoulder 22. In order to retain the spacer ring 36 in position, an annular nut 38 having its upper end adapted to bear against the bottom of the spacer ring 36 is fitted into an internally threaded portion of the bottom of the skirt 14. When nut 32 is screwed into position, the whole piston and wrist pin assembly is firmly locked thereby making it easier to handle. Screws 42 are provided with the annular nut 32 to prevent slipping that might otherwise be caused by the vibratory action of the engine when in operation.

It will be noted that the assembly of the wrist pin with the piston is very simple and the fastening means are at the open end of the piston chamber thereby eliminating the inconvenience experienced in the assembly of ordinary types of pistons in which the wrist pin is fastened adjacent the upper or closed end. It will also be seen that the wrist pin being of hollow construction is very light in weight and due to its conformation provides a maximum of bearing surface, while still providing great strength and rigidity to resist the stress of high pressures under which the piston operates in high speed, high compression internal combustion engines.

Having thus described the invention, what is claimed as new is:

1. The combination with a piston having a chamber therein provided with an open end, a wrist pin seat in the wall of said chamber facing said open end, a pin having ends seated upon said seat, a collar having a portion for embracing said ends to hold the same to said seat and fastening means adjacent the open end of said piston for holding said collar in position.

2. The combination with a piston having a chamber therein provided with an open end and an internally threaded portion on the interior wall of said chamber adjacent said open end, a pin seat facing toward said open end, a pin having end portions adapted to fit said seat and a central bearing portion of larger cross sectional area than the cross sectional area of said end portions, an externally screw threaded member for engaging the screw threads at the end of said chamber and a collar between said externally screw threaded member and said wrist pin for holding the same to its seat.

In testimony whereof I affix my signature.

CHARLES A. NEVINS.